May 24, 1966 A. G. BALE, JR 3,252,530
MOISTURE CONTROL SYSTEM AND APPARATUS FOR BATCH PROCESSES
Filed Feb. 18, 1964 2 Sheets-Sheet 1
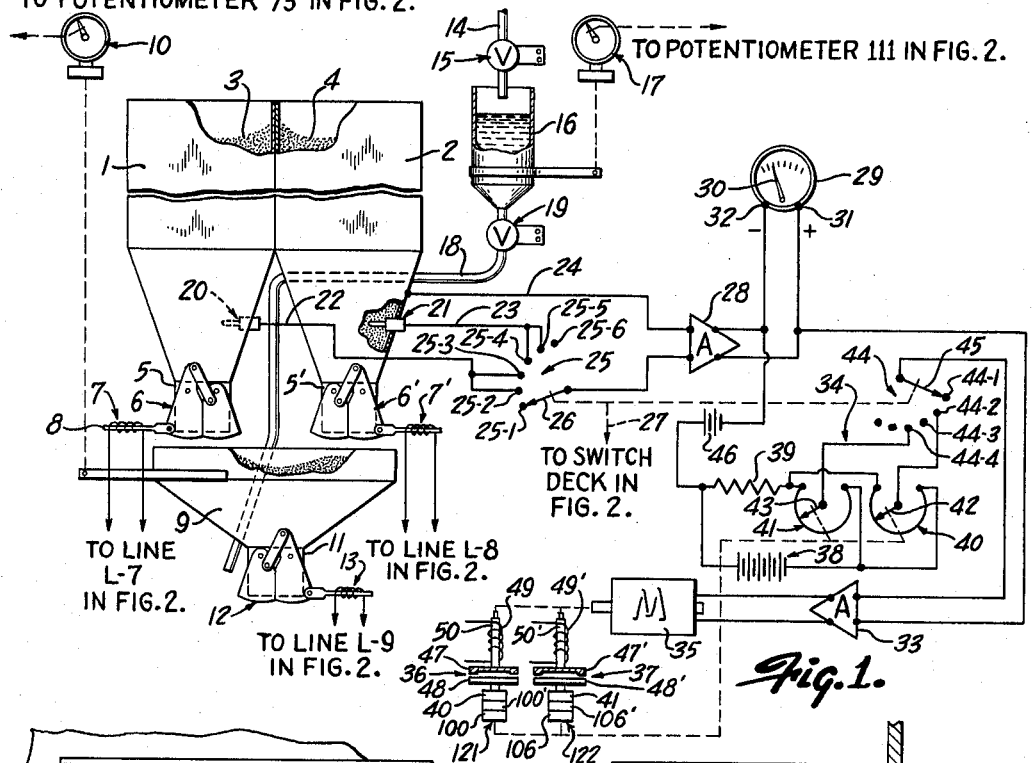
Fig. 1.
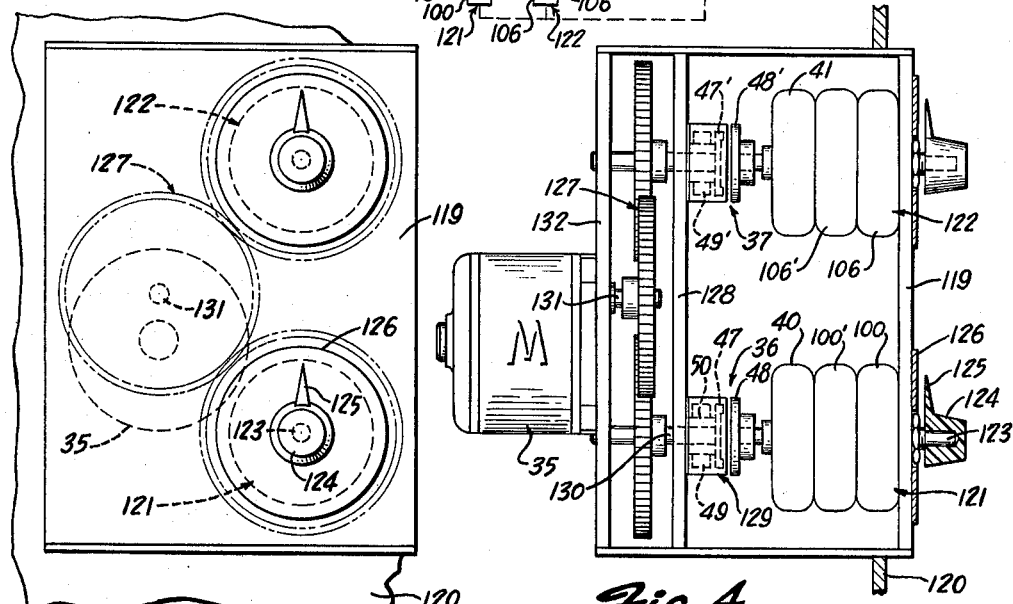
Fig. 3.
Fig. 4.
INVENTOR.
ALTON G. BALE, JR.
BY
Andrus & Starke
ATTORNEYS

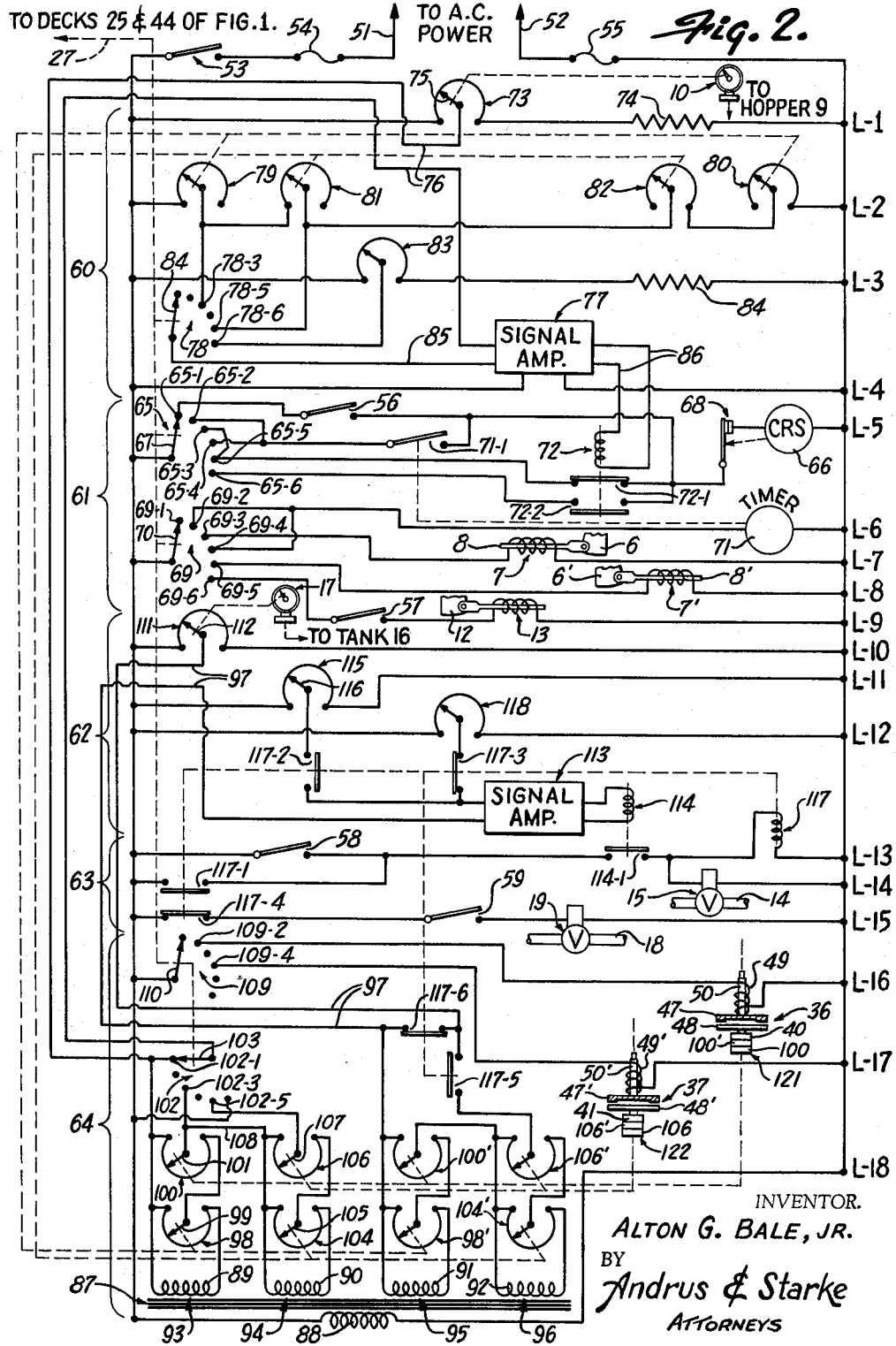

United States Patent Office 3,252,530
Patented May 24, 1966

3,252,530
MOISTURE CONTROL SYSTEM AND APPARATUS
FOR BATCH PROCESSES
Alton G. Bale, Jr., Greendale, Wis., assignor to Wisconsin
Electrical Mfg. Co., Inc., Milwaukee, Wis., a corporation of Wisconsin
Filed Feb. 18, 1964, Ser. No. 345,787
17 Claims. (Cl. 177—63)

This invention relates to a moisture control system and apparatus for adding a selected quantity or weight of fluid and other solid materials in a batch process wherein the solid materials may already carry a small but effective quantity of the fluid.

Although broadly applicable to batch processing, the present invention has been applied to mixing of concrete and the like and will be described in connection therewith for illustrative purposes only. In making concrete, stone and sand of various character, called aggregate, are mixed in preselected weight ratios and water is then added. It is important that the correct dry weight of sand and stone be provided and it is desirable in certain applications that the amount of water in the final mix be closely regulated. Consequently, the moisture content of the aggregate must be considered and compensation made when the aggregates are weighed and when the water is added.

For example, concrete for highway paving and the like must be of predetermined strength and finish. To obtain the desired results, the mixture of the ingredients is based on scientific analysis. The actual mixing or batching of the aggregate and water, however, is generally done by workers of substantially less skill. A highly reliable and satisfactory batch processing system which can be operated by unskilled labor is shown in the United States Patent 3,125,176 which issued to Alton G. Bale, Jr. and Gregg F. Turner, on March 17, 1964, entitled Automatic Control for Cumulative Delivery of Materials and which is assigned to a common assignee herewith. As disclosed therein, an automatic cumulative weighing system is provided in which preselected amounts of material or commodities are manually set in an electrical control by proper positioning of input dials for each aggregate material in accordance with the individual materials to form a final mix. The dials are coupled to potentiometers which are selectively and automatically inserted into a voltage dividing circuit to insert a signal into an electrical balance system having an output established in accordance with the balance and unbalance conditions. The receiving means are interconnected to a component in the balancing system to provide an automatic feedback signal into the system in accordance with the weight of the aggregate being added. The output sequentially controls delivery of the respective aggregates which are fed to the weighing hopper or other receiving means.

The system disclosed in the previously referred to Bale et al. application is particularly satisfactory because the operator directly sets the dial to the weight desired without the necessity of mentally adding of the several ingredients to determine the cumulative weights. The present invention may be particularly employed in the above described system or other suitable controls to provide a highly accurate control of the weight of aggregates and the moisture content of the final mix.

The present invention is particularly directed to a servo driven electrical circuit conditioning means including potentiometers or the like which are interconnected in a control circuit to provide automatically a moisture compensating signal in accordance with the moisture content of the aggregate being fed into the batching process. However, because of the inherent possibility of failure of any control system, the circuit preferably also permits manual control of the addition and compensation of water. The batching process can then be manually controlled, in the event of malfunctioning of the automatic control, to maintain processing and production while the automatic control system is being checked, maintained and repaired.

In accordance with the present invention, clutch means may be provided to selectively couple several moisture compensating potentiometers to a servo system whereby they are automatically set in accordance with the moisture content of the several aggregates. In operation, the aggregate moisture content is electrically sensed by a suitable probe or other suitable means and normally actuates a visual moisture indicating device or meter mounted on the control panel adjacent the potentiometer control knobs. The output of the probe means is also fed to a servo system to automatically set the potentiometers in accordance with the moisture content. When automatically set up, the adjacent potentiometers and the moisture meter provide a means to interrelate and check the operation of the control circuit. If the system malfunctions for any reason, the operator can disconnect the automatic control and through manual manipulation of the several control potentiometers including the moisture compensating potentiometers maintain processing and operation of the batching plant. The use of selectively actuated clutches thus allows the coupling of the potentiometers to the servo system to provide sequential establishment of the control signals prior to or as the individual materials are being weighed. Further, the clutches provide the highly practical characteristic that in the event of breakdown of the automatic control system, the potentiometers may be manually preset to provide the desired compensating signals.

In accordance with the preferred construction of the present invention, the several sensing probes are selectively connected into the servo system to provide a signal to the moisture meter and to the servo system. The servo system includes a feedbock potentiometer connected to oppose the signal from the probes and positioned by a servo motor driven in accordance with the difference in the voltage signals established by the moisture meter and the feedback potentiometers. The servo motor drives the feedback potentiometers to a null position thereby ceasing operation of the servo system and simultaneously drives the compensating potentiometer to a corresponding position which is proportional to the moisture content. In accordance with the present invention, an offsetting electrical reference voltage system is interconnected with the moisture meter and feedback potentiometer as an input to establish a reference signal to the servo system when the moisture meter is at zero against which the servo system can balance to establish zero. This maintains a null voltage about which the amplified signal to the servo motor fluctuates and provides a positive acting signal at all times. If the potentiometer and the moisture meter had to both be at zero voltage to null or balance the system, drifting of the feedback potentiometer past zero would recycle the servo system and create an erroneous setting of the compensating potentiometers. With the electrical offset of this invention, movement of the feedback potentiometer past the zero or null point creates a reversing signal which is applied to the servo motor to reverse the drive directly to zero or null.

In accordance with the present invention, the servo motor is preferably electromagnetically coupled to an aggregate control potentiometer and a water input control potentiometer for each of the aggregates, providing paired moisture control potentiometers. The clutches are sequentially energized such that the paired control potentiometers will be driven in accordance with the rotation of the servo motor and provide a pair of voltage signals in accordance with the moisture content of the corresponding aggregate. The pair of controlled potentiometers is energized by a signal proportional to the weight setting of the corresponding aggregate; for example, by connecting the control potentiometers with aggregate preset potentiometers. Thus, the control potentiometers are set in accordance with the moisture content and are energized in accordance with the weight of the material being checked. The positioning of the control potentiometers thus provides a percentage compensating voltage signal always related to the preset voltage. The pair of related signals is respectively interconnected one each in the aggregate feed control and in the water feed control. In the aggregate feed system, the voltage signal will be such as to cause the aggregate scale at nulling out or balance to read greater than the preset setting. This will reflect the fact that the sensed weight of material being fed to the hopper is partly moisture and consequently in order to provide a proper dry weight of material, additional material must be inserted.

In the water feed system, the voltage signal will be connected however to provide an opposite effect such that the amount of water inserted will read less than the preset setting by a corresponding amount. As a result, the total water in the final mix will be the combined sum of the water added to the mix plus the moisture carried by the aggregate, thereby providing a total proper water-aggregate mixture.

The present invention is thus primarily directed to a batching process wherein a plurality of aggregates or commodities are intermixed and inherently normally carry a certain amount of moisture. The final mix of the process is required to have a closely regulated dry weight amount of aggregates and may require similar regulation of the water added and the present invention particularly provides a combined automatic or manual compensating control of both. The final results can be predetermined by scientific analysis and obtained by persons of minimum technical skills as a result of the operation of the control system. The moisture control of the present invention is also particularly satisfactory because it can be readily adapted to existing batching control systems, such as that of the previously referred to copending application.

The drawings furnished herewith illustrate a preferred construction of the invention including the several features as set forth above as well as others, with the following description.

In the drawings:

FIG. 1 is a diagrammatic illustration of a batch feed system and a servo system providing a moisture content control signal to be incorporated in the circuit of FIG. 2;

FIG. 2 is a schematic circuit diagram of a control circuit including a material delivery and moisture compensating system of the present invention;

FIG. 3 is a fragmentary front elevational view of a control panel including input controls for the circuit shown in FIG. 2; and FIG. 4 is a side elevational view of FIG. 3 showing the mounting details of a preferred construction.

Referring to the drawings and particularly to FIG. 1, the present invention is illustrated in the application of mixing of concrete or the like to automatically control delivery of different aggregates from storage bins 1 and 2. Storage bin 1 may include sand 3 and bin 2 may include stone 4 for use in the preparation of concrete at either a permanent site or, in the instance of highway paving, a temporary installation which is set up near the point of use. In the illustrated embodiment of the invention, only two materials are shown. Often, a greater number of aggregates may be intermixed to provide the desired concrete mix. However, the pair of materials will clearly illustrate the present invention and the manner in which further aggregate might be added.

The storage bins 1 and 2 are generally conventional devices and permit the respective materials to be gravity discharged through a bottom discharge opening or nozzle 5.

The bins 1 and 2 are similarly constructed and the structure of bin 1 is hereinafter described with the corresponding elements of bin 2 similarly numbered with primes added to distingush therebetween.

A suitable gate 6 normally closes the discharge nozzle 5 to retain the sand 3 within the bin until such time as it is to be fed therefrom. The illustrated gate 6 is a conventional jaw type having a pair of channel-shaped members pivotally secured to the walls of the nozzle 5. The gate 6 is positioned by a solenoid 7 having an armature 8 connected to one of the jaws. When the solenoid 7 is de-energized, the gate 6 is disposed immediately below the opening 12 to close the opening and retain the material therein. Energization of solenoid 7 moves the armature 8 such that the jaws are laterally swung from beneath the opening and allow the sand to fall freely from the bin 1 into a weighing hopper 9 which is positioned immediately below both the nozzles 5 and 5' of the respective bins 1 and 2.

The weighing hopper 9 is coupled to a suitable scale 10 by a conventional means such as diagrammatically illustrated in FIG. 1. The scale 10 indicates the total weight of materials within the hopper 9 and thus in the present instance will provide an indication of the sand 3 and stone 4 which has been fed thereto. The main hopper 9 is provided with a discharge opening or nozzle 11 having a jaw type gate 12 similar to gate 6. A solenoid 13 is similarly coupled to the gate 12 for selective opening and closing of the discharge opening 11.

The preselected mix of sand 3 and stone 4 fed to the weighing hopper 9 is subsequently delivered from the hopper to any suitable transporting device, not shown, such as a truck or the like. Additionally, water is added to the mix via an incoming main water line 14. The line 14 is normally held closed by a solenoid valve 15 and is adapted to be selectively opened to feed water into a water weighing tank 16 for subsequent mixing with the aggregate from hopper 9. The tank 16 is interconnected to a water scale 17 for sensing the weight of water similar to the action of scale 10. The tank 16 includes a lower discharge line 18 having a separately actuated solenoid valve 19 for selective delivery of the water to the aggregate mix.

The water fed to the tank 16 and subsequently provided to the aggregate mix should be decreased by the quantity of water carried by sand 3 and the stone 4 which is fed to the hopper 9. In order to compensate for such moisture, the present invention provides the electrode units 20 and 21 similarly secured and projecting inwardly into the respective bins 1 and 2. A sand signal lead 22 is connected to the electrode unit 20 and a stone signal lead 23 is connected to the electrode unit 21. A common return lead 24 is connected to the walls of the bin structure to provide a return circuit path between the electrode units and the walls of the bins. Such electrode units are well known and no further description thereof is given other than to note that they provide an electrical resistance between the signal leads and the common return lead proportional to the surface moisture on the respective materials within the bins.

The electrode units 20 and 21 are selectively and sequentially connected into a servo system as hereinafter described by a stepping switch deck 25 having a movable switch arm 26 selectively engaging a series of six contacts 25-1 through 25-6, inclusive.

The switch deck 25 is one of a plurality of switch decks which are hereinafter described and is interconnected therewith for simultaneous operation as shown diagrammatically by the dashed coupling line 27 from contact arm 24. Each of the switch decks is given its own number with the six contacts identified by the corresponding number and the sub-numbers 1 through 6, inclusive. Each of the contacts 1 to 6, inclusive, in the several decks generally is a similar position contact and they are identified respectively as the home or start contact −1, the sand moisture compensation set-up contact −2, the pour sand contact −3, the stone moisture compensation set-up contact −4, the pour stone contact −5 and the discharge contact −6.

The sand signal lead 22 from the electrode unit 20 is connected to the contacts 25–2 and 25–3 of deck 25 and thus are connected in the circuit during the setting up for the sand moisture compensation and the pouring of the sand from the bin 1 into the hopper 9. Similarly, the stone signal lead 23 is connected to the contacts 25–4 and 25–5 for insertion into the circuit during the setting up of the stone moisture compensation and the pouring of the stone from the bin 2 into the hopper 9. A moisture meter amplifier 28 has its signal input connected to the common lead 24 and the contact arm 26. The moisture meter amplifier 28 may be any suitable regulated D.C. power source providing a direct current in accordance with the moisture content of the material within the respective bins as reflected in the electrode units 20 and 21, with or without amplification. Although an A.C. power source may be employed, care must then be taken to avoid interference from other A.C. power lines and systems.

The output of the amplifier 28 is connected to a moisture meter 29 of a well known use and construction or the like. The meter 29 includes a visual indicating scale 30 providing a percentage reading of the moisture content of the material in the respective bins. As is well known, the input leads to the moisture meter provide a positive terminal 31 and a negative terminal 32 with the voltage therebetween proportional to the moisture content as noted on the visual indicating system of the meter 29. In accordance with the present invention, the voltage appearing between the terminals 31 and 32 is connected into the servo system which includes a signal comparing amplifier 33 and a feedback and reference voltage system 34 interconnected to drive a servo motor 35 in accordance with the difference in the voltage signals established by the amplifier 28 and the voltage system 34. The output of the servo motor 35 is coupled to the feedback and reference voltage system 34 to oppose and balance the voltage of the moisture meter 29. Additionally, the servo motor 35 is coupled to drive a sand set-up clutch 36 and a stone clutch 37 which as hereinafter described are coupled to the set-up circuit of FIG. 2 and in particular to potentiometers therein to provide automatic moisture compensation as more fully described hereinafter with respect to FIG. 2.

Since the servo motor 35 is any well known construction and may be the conventional two phase reversible motor widely employed in servo systems, no further description is given.

The voltage system 34 of FIG. 1 includes a regulated direct current source 28 shown as a battery for purposes of simplicity and explanation of illustration. The source 38 is connected across an electrical offsetting resistor 39 in series with paralleled sand feedback potentiometer 40 and stone feedback potentiometer 41. A fixed voltage drop therefore appears across the potentiometers 40 and 41 which includes the signal taps 42 and 43, respectively. The potentiometer taps 42 and 43 are sequentially connected into the servo system by a stepping switch deck 44 having a switching arm 45 selectively engaging contacts 44–1 through 44–6, inclusive, with the respective contacts related respectively to the corresponding contacts of stepping switch deck 25. The output tap 42 of the sand feedback potentiometer 40 is connected to the second contact 44–2 which is identified as a set-up sand moisture contact. The stone set-up moisture contact 44–4 is connected to the output tap 43 of the stone feedback potentiometer 41. Taps 42 and 43 are mechanically coupled to the output of the servo motor 35 through clutches 36 and 37 and are positioned in accordance with the operation of the motor to provide a feedback voltage signal which is inserted in circuit with the voltage of the meter 29 to balance the system.

A D.C. reference voltage 46 is also connected in circuit in series between the meter 29 and the voltage system 34 to provide proper operation of the circuit.

The polarity of the voltage 46 is such that it adds to the voltage of the meter 29 to provide a basic total voltage. For example, at full scale meter 29 may provide an output voltage of one-tenth of a volt. Battery 46 may provide an additional one-tenth of a volt providing a total of two-tenths of a volt which must be balanced by the voltage of the voltage system 34. As a result, the source 38 would normally have a corresponding two-tenths of a voltage. This voltage is applied and divided across the resistor 39 in series with either potentiometer 40 or potentiometer 41. In accordance with this invention, the resistor 39 is selected to establish a voltage slightly less than that of the meter 29; for example, .09 volt. As a result, .11 volt will be impressed across the potentiometer. Consequently, when the moisture meter 29 is at zero, battery 46 provides what may be called a positive one-tenth of a volt in the circuit. This is balanced by the .09 volt appearing across the resistor 39 and the voltage of the respective potentiometers 40 or 41. The potentiometers must therefore be set from the zero end of the potentiometer to establish .01 of a volt which when added to the .09 of a volt provides a bucking signal to balance .1 volt of the reference voltage source 46 and provide a zero input to the amplifier 33 to stop the motor 35. If for any reason, such as motor drift, the connected potentiometer tap 42 or 43 drifts below the .01 volt setting, a net positive signal is applied to the amplifier 33 and the motor 35, tending to drive the potentiometer 35 in the reverse direction towards the .01 voltage setting. Reference resistor 39 thus offsets the true zero of the potentiometers 40 and 41 such that a reset voltage can be applied to the motor 35 to cause reversal at or adjacent the zero position and prevent accidental recycling which causes erroneous set-up within the control circuit of FIG. 2 and particularly the potentiometer settings which are made by motor 35 via the clutches 36 and 37.

The sand clutch 36 and the stone clutch 37 are diagrammatically and similarly shown as friction type clutches for purposes of simplicity of illustration and description. Clutch 36 is described with the corresponding elements of stone clutch 37 identified by primed numbers. Clutch 36 includes a motor driven plate 47 coupled to motor 35 and output plate 48 coupled to the potentiometers. A control winding 49 is wound on a core 50 secured to the back side of driving plate 47 for selective movement into frictional drive engagement with the output plate 48.

The operation of the servo system is first briefly summarized as follows.

The stepping switch deck 25 is driven in timed relation as hereinafter described to sequentially connect contacts 25–2 through 25–4 into the circuit. When contact 25–2 is connected into the circuit, the output of the amplifier 28 provides a signal which varies in relationship to the moisture content of the sand 1. This is reflected in a corresponding reading of the meter 29 with the voltage between the terminals 31 and 32 varying accordingly. This voltage is added to the voltage system 34 to provide a net signal to the amplifier 33 which in turn drives the motor 35. The output of the motor is coupled to the tap 42 through clutch 36 to reposition the tap until the voltage of the potentiometer 40 just balances the voltage of the meter 29 and thus provides a null condition whereby the motor 35 is de-energized. The sand compensating clutch 36 simultaneously positions water compensation potentiometers to set up a moisture compensating voltage signal. When the stepping switches 25 and 44 are stepped to the third position, the circuit of the potentiometer 40 is opened as contact 44-3 is a dead contact. Contact 25-3 which is connected to electrode unit 20 maintains a signal to the moisture meter 29 and holds visual indication of the moisture condition. In this portion of the cycle, the circuit of FIG. 2 is positioned to automatically pour sand from bin 1 into the hopper 9. The stepping decks 25 and 44 then move to contacts 25-4 to insert the stone sensing electrode unit 21 in the servo system and simultaneously couple the clutch 37 to the motor 35. The circuit then operates in a similar manner to that just described to provide a moisture compensating signal within the circuit of FIG. 2 for the stone 4 fed to hopper 9.

The operation and connection of the various electrical and mechanical components including the positioning of the switching decks, the energization of the clutch windings and the connection of the clutches to the several potentiometers in FIG. 2 is shown by proper labels and numbers or partial reproduction of the corresponding components of FIGS. 1 and 2.

Generally, the control circuit, as shown in FIG. 2, is an across the line type diagram having A.C. power lines 51 and 52 shown running vertically along the left and right sides of the drawing. The cross branch lines are numbered at the connection to line 52 along the right edge beginning with the top line and proceeding downwardly as lines L-1 through L-18, inclusive.

The incoming power lines 51 and 52 are connected to a suitable power source such as conventional alternating current distribution power systems employed in the United States. A master control switch 53 is shown connected in line 51 and similar protective fuses 54 and 55 in lines 51 and 52 in accordance with general practice.

In the illustrated embodiment of the invention, a manual start switch 56 is provided in line L-5 to initiate operation of the aggregate weighing control circuit. A manually operated aggregate discharge switch 57 is provided in line L-9 to control energizing of solenoid 13 and therefore discharging of the material from the hopper 9. A manual start switch 58 is provided in line L-13 to initiate operation of the water weighing control circuit and a final water discharge switch 59 is provided in line L-15 to discharge the water from the tank 16 into the receiving means, not shown.

Generally, the control circuit of FIG. 2 may be divided into five general sections for purposes of clarity of description as follows: an aggregate weight sensing section 60 which includes lines L-1 through L-4, inclusive, and provides an automatic sensing of the amount of material fed from the respective bins 1 and 2 into the hopper 9; an aggregate discharge and switch drive section 61 which includes lines L-5 through L-9 and is employed to automatically and sequentially feed the sand 3 and stone 4 into hopper 9 and actuate the several stepping switch decks to the several contacts; a water weight sensing section 62 which includes lines L-10 through L-12 and provides an automatic sensing of the amount of water to be added to the final mix; a water discharge section 63 which includes lines L-13 through L-15 and is coupled to the output of the water weight sensing section 62 for controlling the feeding and discharge of the water to and from the tank 16 to the receiving means; and a moisture compensating section 64 which includes lines L-16 through L-18 and is connected to establish compensating signals in accordance with the operation of the servo system more clearly shown in FIG. 1. The compensating signals are inserted into the aggregate weight sensing section 60 and the water weight sensing section 62 to provide a final mixture having selected parts of dry aggregate and water.

The discharge and switch drive section 61 provides the desired sequencing and includes a switch deck 65 coupled to the other switching decks and a drive member 66 to form a stepping switch of any known or suitable construction. The stepping switch may be a rotary solenoid which is shown diagrammatically herein as including a driving coil 66 connected in line L-5 with the contacts 65-1 through 65-6 of switch deck 65. Switch deck 65 includes a contact arm 67 connected directly to the power line 51 and selectively engages contacts 65-1 through 65-6. Driving coil 66 is connected in a series circuit with the contacts of deck 65 and has one side connected directly to line 52 and the opposite side connected in series with an automatic stepping contact 68 to the paralleled circuits. The start contact 65-1 is connected in series with the start switch 56 to the common junction of contact 68 such that closing of the start switch 56 energizes the driving coil 66 to effect an initial stepping of all of the switch decks previously and hereinafter described.

An aggregate discharge control switch deck 69 forms a part of the circuit section 61 and includes a contact arm 70 connected directly to the line 51 and selectively engaging contacts 69-1 through 69-6. The respective contacts are connected to selectively and sequentially operate the various operating coils associated with the gates of bins 1 and 2 and hopper 9, as hereinafter described.

A timer 71 in line L-6 is connected in circuit with the contacts 69-2 and 69-4 in line L-6 to provide timed periods for sensing and establishing a compensating signal for the moisture content of sand 3 and stone 4. The timer 71 which is shown diagrammatically in FIG. 2 may be any conventional or suitable timer; for example, a relay with a damping means, a motor operated timer or the like. In response to the initial step of the switching system as a result of the closing of switch 56 in the circuit of deck 65, the contact arm 70 of deck 69 moves to contact 69-2 and energizes the timer 71. The timer closes a set of normally open contacts 71-1 after a preselected timing period; for example, three seconds. The timing contacts 71-1 are connected to the contacts 65-2 and 65-4 of the switch deck 65. Contacts 65-2 and 65-4 are, as previously noted, respectively the sand moisture compensation set-up contacts and the stone moisture compensation set-up contacts. In these switch positions, the circuit to the driving coil 66 is held open for a selected period; for example, three seconds, to allow the servo balancing circuit to operate and provide the necessary compensation of the setting of the weighing circuits 60 and 62 in accordance with the aggregate moisture content. At the end of such time, the timer contacts 71-1 close to effect energization of the coil 66 and the stepping of the respective switches to the next related contacts -3 and -5. The third contacts -3 constitute the pour sand contact and thus when the switch decks are so stepped, a sand pouring circuit is established through circuits 60 and 61 which are interconnected by a control relay 72 for controlling discharge of sand 3 from bin 1. The control relay 72 is connected to the output of the aggregate weighing section 60 for energization in accordance with the weight of the sand fed to the hopper 9 and includes contacts 72-1 and 72-2 in line L-5 of the circuit section 61.

When the switch deck 69 moves to the third position, it completes the circuit through line L-7 which includes the solenoid 7 for gate 6. Solenoid 7 is energized and gate 6 opens to discharge sand 3 from bin 1 into the hopper 9.

As the sand is added to the hopper 9, the increasing weight is reflected in the scale 10 which in turn operates the control aggregate weighing section 60.

The aggregate weighing section 60 which includes lines L-1 through L-4 corresponds to that of the previously referred to copending application, modified to reflect the present invention. Generally, the weighing section 60 is a voltage dividing network including a scale potentiometer 73 in series with a resistor 74. A movable tap 75 of the potentiometer 73 is coupled to the scale 10 for positioning in accordance with the weight of the material in the hopper 9 and creation of a weight proportional voltage. The tap 75 is connected in series with moisture signal compensating leads 76 to one side of a signal amplifier 77 having an output connected to relay 72. The opposite side of the amplifier 77 is connected to a stepping switch 78 which sequentially inserts preset potentiometers into the amplifier circuit. As in the previous application, a pair of sand preset potentiometers 79 and 80 is serially connected with a pair of stone preset potentiometers 81 and 82 in line L-2 between lines 51 and 52. Preset dials, not shown, are coupled to the taps of the paired potentiometers 79-80 and 81-82 for presetting of the amount of sand and stone to be delivered. A resetting or zero sensing potentiometer 83 is connected in series with a resistor 84 in line L-3 between lines 51 and 52. Stepping switch deck 78 has its sand pour contact 78-3 connected to the tap of the sand preset potentiometer 79 and its stone pour contact 78-5 connected to the tap of potentiometer 81, to provide voltage signals in accordance with the preset amount of sand and stone to be delivered to the hopper 9. The tap 84 of deck 78 is connected by lead 85 to amplifier 77 and inserts the voltage signals at the respective contacts to balance the voltage inserted by potentiometer 73 and reduce the output of amplifier 77 to zero. Power is supplied to amplifier 77 via line L-4. The amplifier 77 is connected via leads 86 to energize relay 72 whenever the preset input signals from potentiometers 79 and 81 exceed the weight responsive signal from tap 75 of the weight sensing potentiometer 73.

When relay 72 is energized, the circuit via pour contacts 65-3 and relay contacts 72-1 to stepping switch coil 66 in line L-5 is broken and the circuit to sand gate solenoid 7 is closed via contact 69-3 in line L-7. Sand 3 is fed to the hopper 9 until the potentiometer 73 is driven to balance the input to amplifier 77, resulting in de-energizing of relay 72. Relay contacts 72-1 close and coil 66 is energized to step to contact 4. Switch deck 69 moves accordingly and opens line L-7 to de-energize gate solenoid 7 and stop the feed of sand. Weighing section 60 operates generally in accordance with that of the previously described embodiment of the invention except for the modification of the voltage signal as a result of the signal applied via the leads 76. The water compensating signal appearing at leads 76 is established by the water compensating circuit section 64 which includes a pair of similar circuits to modify the aggregate weight sensing section 60 as well as the water weight sensing section 62 which is hereinafter described.

Generally, the section 64 includes an input control transformer 87 having a primary 88 connected between leads 51 and 52 and four secondary windings 89, 90, 91 and 92. Each of the secondaries is interconnected to provide a signal to a corresponding sand weight compensating circuit 93, a stone weight compensating circuit 94 and a water weight compensating circuit 95 for sand moisture and a water weight compensating circuit 96 for stone moisture.

The compensating circuits 93 and 94 are interconnected to provide a voltage signal at leads 76 proportional to the moisture content in the sand and the stone and the preset weights of the sand and stone. The circuits 95 and 96 generally correspond to circuits 93 and 94 and are similarly interconnected to provide a similar but reversed polarity compensating voltage at the leads 97. Consequently, circuits 93 and 94 will hereinafter be described in detail with the corresponding elements of circuits 95 and 96 similarly numbered for clarity and simplicity of explanation.

The sand weight compensating circuit 93 includes a sand preset potentiometer 98 connected directly across the secondary 89. Potentiometer 98 includes a presetting tap 99 which as shown is ganged with and set with the sand preset potentiometers 79 and 80 of the aggregate weight sensing section 60 to provide a voltage signal at the preset tap 99 which is directly proportional to the weight of sand 3 to be delivered to the hopper 9.

A sand moisture percentage potentiometer 100 is connected between the tap 99 and the left side of the potentiometer 98 to be energized in accordance with this proportional voltage. The percentage potentiometer 100 includes the tap 101 which is mechanically coupled to the output plate of the sand clutch 36. Tap 101 is positioned in accordance with the previously described operation of the servo system and is thus positioned from the zero setting in accordance with the percentage of moisture in sand 3.

A stepping switch deck 102 has its output connected to the leads 76 and includes contacts 102-1 through 102-6 and a switch arm 103 coupled with the other switch arms to coil 66. The tap 101 of the sand-moisture percentage potentiometer 100 is connected to contact 102-3 to insert the compensating voltage across lines 76 and thus into the aggregate weight sensing section 60 when the decks are moved by operation of the stepping switch coil 66 to the sand contact -3. The balancing or cutoff voltage signal applied to the amplifier 77 is the summation of the voltages established by the scale potentiometer 73 and the compensating signal appearing across line 76 which in turn is directly proportional to the setting of the tap 101 of the sand-moisture potentiometer 100. The polarity of the voltage across line 76 is such as to oppose the voltage of the preset potentiometer 73. Consequently, sand continues to flow to hopper 9 until the scale 10, at balance, reads greater than the preset setting of potentiometer 79. The difference corresponds to the percentage of moisture in the sand 3.

The water-weight compensating circuit 95 for sand moisture is similarly constructed and functions in a similar manner to provide a corresponding compensating voltage at lines 97. This polarity is interconnected into the water scale system as hereinafter described however to reduce the amount of water fed into the mixture by a corresponding amount and thus compensating for the moisture in the sand.

The stone weight compensating circuit 94 generally corresponds to the sand weight compensating circuit 93 and includes a stone preset potentiometer 104 connected across its related secondary 90. The preset tap 105 of the potentiometer 104 is coupled or ganged to the stone preset potentiometers 81 and 82 of the aggregate weighing section 60, as diagrammatically shown. A stone-moisture percentage potentiometer 106 is connected between tap 105 and the left side of potentiometer 104 to provide a compensating voltage signal at tap 107 of potentiometer 106 in accordance with the percentage of moisture carried by stone in bin 2. The tap 107 is connected to contact 102-5 such that the voltage appearing across potentiometer 106 is inserted in the circuit when the switch decks are moved to the pour stone contact 5. A lead 108 interconnects the tap 101 to the potentiometer 106 such that the compensating moisture signals of the potentiometers 100 and 106 are connected in series across lines 76 at the pour stone contact 5. This is necessary to provide compensation in accordance with the cumulative effect of the moisture on the sand 3 and the stone 4. Tap 107 of the percentage potentiometer 106 is connected to the output plate 47′ of the stone clutch 37. A separate clutch stepping switch deck 109 sequentially operates clutches 36 and 37 to compensation potentiometers 100 and 106 in accordance with the moisture content, as follows. Deck 109 includes a contact arm 110 selectively engaging contacts 109-1 through 109-6 in synchronism with the other related switch decks. The winding 49 of clutch 36 is connected to contact 109-2 in line L-16. As a result, during the sand weight compensating set-up period, the winding 49 is energized and clutch 36 is engaged to couple the output of the servo motor 35 to the potentiometer tap 101 of the circuit section 64. Therefore, tap 101 is set to the proper percentage position as a result of the operation of the servo system.

The winding 49′ is connected in series with contact

109–4 of deck 109 in line L–17 and is thus energized during the stone weight compensating set-up cycle to similarly position tap 107.

The circuits 95 and 96 are similarly constructed and preset, and operate to provide a corresponding related voltage signal at the output leads 97 which is connected into the water weight sensing section 62 to be presently described.

Section 62 includes a water scale potentiometer 111 in line L–10 having a tap 112 coupled to the water scale 17. The tap 112 is connected to one side of a signal amplifier 113 in series with the leads 97 such that the voltage input to the amplifier is the sum of the voltages at tap 112 and the voltage across leads 97. The output of the amplifier 113 actuates a control relay 114. A water preset potentiometer 115 is connected in line L–11 between the lines 51 and 52 and includes a tap 116 connected to the opposite side of the amplifier 113 with the input signal being equal to the algebraic sum of the two input signals, as in the weight sensing section 60. The output of the amplifier 113 is connected to selectively energize relay 114 and close the normally open contacts 114–1.

The contacts 114–1 are connected in series with the manual start switch 58 and the water batch solenoid valve 15 in lines L–13 and L14. When contacts 114–1 close, solenoid 15 is opened to admit water from line 14 into the weighing tank 16. An interlock relay 117 is connected in parallel with the solenoid 15 and energized simultaneously therewith. The relay 117 closes a set of latching contacts 117–1 which are connected in parallel with switch 58 such that momentary closing of switch 58 sets up the water delivery circuit. The interlock relay 117 further controls a set of normally open contacts 117–2 connected in series between the tap 116 and the amplifier 113 and a set of normally closed contacts 117–3 connected in series between a water zero cutoff potentiometer 118 which functions in the same manner as the zero cutoff potentiometer 83 of the aggregate weight sensing section 60. Relay 117 also controls a set of normally open contacts 117–5 to insert the moisture compensating voltage during water weighing and a set of normally closed contacts 117–6 connected directly across line 97 to remove the compensating voltage during water discharge. When the relay 117 is energized, contacts 117–2 close to insert the preset potentiometer 115 in the balancing circuit and contacts 117–3 open to disconnect the zero cutoff potentiometer 118. Contacts 117–6 open and contacts 117–5 close to insert the moisture compensating voltage in lines 97.

The amplifier 113 is then biased in accordance with the difference in potential between the tap 116 of preset potentiometer 115 and tap 112 of the water scale potentiometer 111 with the latter being modified by the water compensating voltage appearing across line 97. The voltage appearing across line 96 will be directly related to the moisture content of the sand and the stone as a result of the series connection of the potentiometers 100' and 106' in the compensating circuit 64, as previously described. This voltage is connected in the circuit to add to the voltage of potentiometer tap 112 such that the voltage applied to the amplifier balances the preset voltage at tap 116 prior to positioning of tap 112 by the scale 17 at the corresponding voltage. Relay 114 is de-energized with the water scale at a balance reading less than the setting of preset potentiometer 115. The difference will correspond to the compensating voltage across leads 97 and the moisture content of the sand and stone.

De-energization of the relay 114 opens contacts 114–1 breaking the latch circuit to the valve 15 and the interlock relay 117. As a result, the flow of water via line 14 stops at the selected desired weight and is held within the weighing tank 16 for subsequent delivery with the mixed material in the hopper 9.

The manually actuated switch 59 is connected in circuit with the solenoid valve 19 and a set of interlock contacts 117–4 in line L–15 between the lines 51 and 52 as a part of the water discharge section 63. When water batching solenoid 15 has been de-energized as a result of the proper weight of water within the tank 9, the relay 117 is de-energized and the normally closed contacts 117–4 and 117–6 return to the closed position. Closing of switch 59 will therefore energize valve 19 and discharge the water from the tank into the aggregate mixture. The contacts 117–4 insure that the water will not be discharged from the weighing tank 16 until such time as a proper weight setting has been established.

The zero sensing potentiometer 118 is set such that when the scale 17 and weighing potentiometer 111 is at zero, there will be just sufficient unbalance differential to provide energization of the sensing relay 114 and closing of contacts 114–1 to condition the circuit to relay 117 and solenoid valve 15 for closing by switch 58. This corresponds to the start of the water discharge cycle. When switch 59 is closed, the discharging of water from tank 16 causes scale 17 and potentiometer 111 to return to zero. On reaching zero, the potentiometer 118 causes energization of relay 114 and re-establishes the circuit for a subsequent cycle.

When the switch 58 is closed to energize relay 117, the relay 114 must be held in while contacts 117–2 close and contacts 117–3 open. This may be provided in any desired manner; for example, the relay 114 can be selected to have a slight delay on drop-out after de-energization such that it will not drop out physically during the transfer of the contacts of relay 117 from zero cut-off to water preset. This is necessary in order to insert the water preset potentiometer 115 in the circuit for filling of the weighing tank 16.

A greater number of aggregate bins can be employed in a practical batching process. Each additional bin may be provided with a corresponding additional circuit component such as shown in the illustrated embodiment of the invention. Additionally, various moisture adjusting and calibrating components and the like would be employed in a practical circuit. Such additions and modifications will of course be obvious to those skilled in the art of circuit designs for batching processes and such modifications have been eliminated or simplified in the illustrated embodiment of the invention in order to prevent obscuring of the important features and various aspects of the present invention.

Before summarizing the operation of the illustrated circuit as interrelated to the batching system of FIG. 1, a practical mounting and drive for the moisture compensating potentiometers 100, 100', 106 and 106' is shown in FIGS. 3 and 4 including mounting plate 119 adapted to be releasably secured as a part of a control panel 120 by suitable mounting screws or the like. A sand potentiometer unit 121 including potentiometers 100, 100' and 40 of FIGS. 1 and 2 and a stone moisture potentiometer unit 122 including potentiometers 106, 106' and 41 are secured in plate 118. The units 121 and 122 are constructed in a similar manner and the mounting of the unit 121 is described with corresponding components of unit 122 identified by similar primed numbers in the drawings.

The potentiometer unit 121 is mounted to the back side of the mounting plate 119 and potentiometers 100, 100' and 40 are actuated by a common input shaft 123 which projects outwardly through the front of plate 119. A positioning knob 124 is keyed in any suitable manner to the exterior end of the input shaft 123 to allow manual positioning of the input shaft 123 and therefor the setting of the related taps 101, 101' and 42 shown in FIGS. 1 and 2. The internal structure of the potentiometer units 100 and 100' are not shown in FIGS. 3 or 4 as they are well known devices and the particular internal mechanical arrangement forms no part of the present invention.

The positioning knob 124 carries a pointer 125 which is positioned with respect to a suitable scale 126 secured in any suitable manner to the plate 119 to indicate the percentage weight of compensation. The moisture meter 29 may conveniently be mounted in the vicinity of the mounting plate 119 to allow simultaneously viewing of the meter 29 and the position of the compensating potentiometers 100, 100' and 40 as indicated by pointer 125.

The opposite or innermost end of the common input shaft 123 is connected to the motor 35 by the clutch 36 and a gear train 127. The clutch 36 is supported by suitable support plate 128 with the components corresponding to the diagrammatic illustration of FIG. 1 similarly shown in FIG. 4. The output plates 48 are coupled to the potentiometer shaft 123. The motor driven plate 47 is rotatably carried in a bearing unit 129 within which the winding 50 is also wound. The gear train 127 interconnects an input shaft 130 of the clutch 36 to the output shaft 30 of the motor 35 which is mounted on a suitable motor mounting plate 132.

As most clearly shown in FIG. 4, the gear train 127 simultaneously drives the clutch plates 47 and 47' of clutches 36 and 37. The transfer of the motion to the potentiometers of the units 121 and 122 is controlled by the energization of the windings 50 and 50'. In the absence of energization of either winding, the potentiometers are disconnected from the motor and gear train and may be positioned by manual rotation of the positioning knobs 124 and 124'.

The control system therefore is arranged for automatic or manual moisture compensating control. For example, by opening of the circuit to the windings 50 and 50', energization of the related windings can be positively prevented. The operator can then view the moisture meter 29 during the sand moisture set-up period and the stone moisture set-up period and manually preset knobs 124 and 124' accordingly. The output compensating voltage signal will then be established across the leads 86 and 97 of the compensating section 64 in the same manner as the automatic control system to be presently summarized. This aspect of the invention is of substantial practical significance in providing a continued operation of the system in the event any malfunctioning of the moisture compensating circuit. During automatic batching the moisture meter and the automatic setting of the related potentiometer units 121 and 122 as reflected in the automatic positioning of dials 124 and 124' will also provide a positive check on the accuracy of the moisture compensating system. If any discrepancy is noted, the automatic system can be disconnected or the operator can manually adjust the system without interruption of the process to provide proper mix ratios.

Operation of the automatic control circuit particularly with respect to FIGS. 1 and 2 is briefly summarized as follows. At the beginning of an initial cycle, the scale 10 and associated scale potentiometer tap 75 in line L-1 are at a zero reading, the preset potentiometers 79 and 82 in line L-2 of weighing section 60 are manually set to a selected weight; for example, 200 pounds. Similarly, the stone preset potentiometers 81 and 82 are set at a selected value assumed to be 200 pounds. Simultaneously, the related potentiometer pairs 98, 98' and 104 and 104' in line L-18 of the compensating section 64 are set at corresponding weight settings. The compensating potentiometers 101 and 101', 106 and 106' are at a zero reading position and energized with a voltage directly related to the preset weight of the respective materials. The several movable contacts of the preset potentiometers are manually controlled by the operator and conventional indicating dials, not shown, will be provided for purposes of registering the desired preset position. The water scale 17 and the water scale potentiometer 111 are at a zero reading and the preset potentiometer 115 is preset to water weight to be added to the aggregate; for example, 50 pounds. The contact arms of the several switch decks 25, 44, 65, 69, 78, 109 and 102 engage the start contact −1.

The master switch 53 is closed to complete the power application to the branch lines L-1 through L-18 connected between power lines 51 and 52. To start the cycle, start button 56 in line L-5 is closed and completes the power circuit through the solenoid 66 of the stepping switch thereby causing the contact arms of the several decks to move to contact −2. The switch deck 65 establishes the timed circuit through contact 65-2 and the normally open timer contacts 71-1. Simultaneously, the movement of the deck 69 to the second position energizes the timer 71 in line L-6 which begins to time out after which the timer contacts 71-1 close to again complete the stepping circuit to the solenoid 66. Referring to FIG. 1, the switch deck 25 is stepped with the other switches to contact 25-2 and thus inserts the electrode unit 20 in circuit with the amplifier 28 during the timing period. The output of the amplifier 28 provides a D.C. signal proportional to the moisture content of the sand 1 which is recorded visually on the moisture meter 29 and is inserted in series with the reference voltage of the source 34 to operate the servo system. Switch deck 44 has moved to contact 44-2 and interconnected the sand feedback potentiometer 40 into the servo system circuit to energize motor 35. Switch deck 109 moves to contact 109-2 and energize the clutch winding 50 thereby engaging clutch 36 and transmitting the motion of motor 35 to the sand moisture compensating potentiometer 100. Motor 35 continues to operate, positioning potentiometer 40, potentiometers 100 and 100'. The movement of potentiometer 40 increases the bucking voltage inserted by the source 34 until such time as the voltage inserted offsets the voltage across terminals 31 and 32 at which time a null signal is established to the servo motor 35 and it discontinues operation. At this time, the potentiometer 100 setting is proportional to the moisture content of the sand 3.

The timer 71 then times out and closes its contacts 71-1, again actuating the solenoid 66 to effect a second step to the pour sand contact −3 of the respective switch decks. Solenoid 7 in line L-7 is energized via contact 69-3 to open the gate 6 and feed sand 3 to the hopper 9. The scale 10 records the increasing weight and positions potentiometer 73 in line L-1 of the aggregate weight sensing circuit 60. Deck 78 moves to contact 78-3 operatively inserting the preset potentiometers 79 and 80 in the weight sensing circuit 60 and relay 72 is energized. The signal of potentiometer 73 is added to the moisture compensating signal from potentiometer 100 and appearing across lines 76 which was established during the second step of the cyle.

As previously noted, the polarity of the voltage at lines 76 opposes the voltage of potentiometer 73 such that at balance, the scale 10 will read a greater reading than that preset in potentiometer 79. When the voltage is balanced out, the relay 72 drops out. The contact 72-1 in line L-5 closes and the solenoid coil 66 is again energized to effect a further step of the respective switch decks to the stone moisture set-up contacts −4.

Switch deck 69 breaks the circuit to the gate solenoid 7 in line L-7 to terminate the feed of sand 3 to hopper 9. Switch deck 69 again completes the circuit to timer 71 in line L-6 and the latter provides for a similar time period to check the moisture in stone 4 and set-up the stone moisture compensating potentiometers 106 and 106'. During this portion of the cycle, the other components of the control circuit are held in standby. Switch deck 25 inserts the electrode unit 21 in the servo circuit to actuate the moisture reading meter 29 and the servo system. Switch deck 44 simultaneously inserts the stone potentiometer 41 in the servo system and motor 35 is driven accordingly to null the servo system. Switch deck 109 interconnects the winding 49' in line L-17 of stone clutch 37 in a complete circuit whereby the clutch 37 interconnects the output of the motor 35 to the stone moisture compensating potentiometers 106 and 106' in line L-18 of FIG. 2. The potentiometers 106 and 106' are thus set in a position corresponding to the percentage moisture content of the stone during the timing period of timer 71.

At the end of the timing period, the timer contacts 71-1 close and energize solenoid 66 to move the switch decks to the pour stone contacts -5. Switch deck 65 moves to contact 65-5 to set up a circuit to solenoid 66 via the normally closed contacts 72-1. However, contacts 72-1 are open as a result of the output of the amplifier 77 of the weighing section.

Switch deck 78 in the fifth position inserts the potentiometer 81 to produce a greater signal than the scale potentiometer 73 which is at the sand weight position previously established. The amplifier 77 establishes an output energizing relay 72 to open contacts 72-1 and prevent operation of the stepping switch as noted above.

Switch deck 69 moving to contact 5 completes the circuit through the line L-8 to the solenoid 7' for gate 6' which normally closes the stone bin 2. As a result, gate 6' opens and discharges stone 4 from the bin 2 into the hopper 9. This results in an increasing weight which is reflected in increasing the scale reading of scale 10 and a corresponding positioning of potentiometer 73 until such time as the potential of the scale potentiometer 73 modified by the new potential appearing across lines 76 balances the input to amplifier 77.

The compensating voltage inserted in the circuit during this period is the sum of the compensating voltage inserted by potentiometer 100 and the stone potentiometer 106 in line L-18. The polarity is such that the aggregate reading of scale 10 at balance will be greater than the preset setting with the difference corresponding precisely to the moisture compensation to be made for the sand 3 and the stone 4.

When the balance is reached relay 72 drops out and closes contacts 72-1 to energize coil 66 in line L-5 and effect a subsequent step of the switch decks to the sixth or aggregate discharge position. Switch deck 65 moves to contact 65-6 to connect coil 66 in circuit through normally open contacts 72-2 and prevent stepping until relay 72 is again energized. This occurs as a result of discharge or emptying of hopper 9 as hereinafter described.

During the previous feeding of sand and stone to the hopper 9, the potentiometers 100' and 106' of the compensating circuit 64 are automatically set with the potentiometers 100 and 106 and create a total compensating voltage signal across leads 97. The compensating voltage is inserted in the water discharge or water weight sensing section 62 via the lines 97. After the sand 3 and stone 4 have been admitted into the hopper 9, the operator manually closes the switch 58 in line L-13 to complete the circuit to the water batch solenoid 15 and the interlock relay 117 resulting in feeding of water into the weighing tank 16. In the water weighing section 62 of FIG. 2, the water scale potentiometer 111 moves upwardly opposing the voltage of the water preset potentiometer 115. As previously noted, the voltage across the leads 97 is inserted opposing the voltage of the potentiometer 111 such that the water scale 17 at balance reads less than the preset setting of potentiometer 115 by the voltage appearing across leads 97. Water equal to the difference between the preset amount and the water content at the sand 3 and stone 4 is actually fed into the weighing tank 6. At this time, the output of the amplifier 113 will drop to zero and relay 114 will be de-energized. As a result, contacts 114-1 in line L-13 open and further transfer of water is halted. The relay contacts 117-4 in line L-15 close and the water can be discharged by closing of switch 59 in line L-15 to complete the circuit to solenoid 19.

The mixed aggregate can be discharged by closing of switch 57 in line L-9 which completes the circuit via the contacts 69-6 of switch deck 65 to the solenoid 13 which controls the gates 12 of hopper 9.

During discharge the circuit returns to standby, as follows.

Switch deck 78 in the sixth position inserts the zero sensing or cutoff potentiometer 83 in line L-3 in the circuit of the signal amplifier 77. When the hopper 9 discharges it drives the scale potentiometer 73 towards zero. The potentiometer 83 is set such that when the scale 10 is at zero, the circuit is just sufficiently unbalanced between the scale potentiometer 73 and the zero cutoff potentiometer 83 to energize the relay 72. Energization of the relay opens contacts 72-1 and closes contacts 72-2 completing the circuit to the solenoid 66 which effects a final step returning all of the decks to the first initial contact. Similarly, in the water discharge section 63 and water weight sensing section 62, the discharge of water by energizing of solenoid valve 19 in line L-15 drives scale potentiometer 111 to zero. The zero sensing potentiometer 119 is connected in circuit to amplifier 113 via contacts 117-3. Potentiometer 119 is set to generally function as potentiometer 83 and to energize relay 114 to close contact 114-1 and allow recycling of the water system.

The batching cycle may then again be started and completed.

As previously noted, the present invention can be applied to mixing of a greater number of materials by the addition of similar circuits. Similarly, other obvious modifications can be made without departing from the spirit of the present invention. For example, other forms of stepping switches might be employed, a single potentiometer may replace potentiometers 40 and 41 with suitable clutching to provide the proper operation, compensation may be provided on aggregate only and not on water where the water is added by other means, and even separate servo input circuits might be employed in place of the stepped system shown. Further, the described sequence is illustrative only. For example, it may be desirable to first provide moisture compensation set-ups for the several aggregate and then simultaneously weigh the water and aggregates. As set forth in the claims, switch means and circuit altering means are recited to broadly cover the various corresponding elements to effect sequential transfer of power between the several operating circuits. Further, although a preferred servo system has been illustrated including many advantages particularly adapted to batching systems, any other suitable and similar system can be employed as long as means are provided to provide moisture compensating settings within the control circuit and the automatic control of the feeding of the aggregate material in accordance with the moisture carried thereby.

The present invention has particularly described a system employing weight ratio although meters or any other quantity delivery sensing means may be employed. Further, the illustrated sequencing is given for purposes of clearly showing one system incorporating the present invention and may be varied as desired. Further, if desired, several material control circuits can be provided with the moisture content of the several materials first sensed and then simultaneous delivery of the materials made with compensation as noted in this application. With sequential delivery of the material, they will be stratified within the receiving hopper and consequently the moisture content may be sensed by suitably located and vertically spaced probes within the weighing hopper or the like. The illustrated probe and servo system is also illustrative of a highly satisfactory system but a static system may also be employed wherein a voltage is generated directly by a sensing means of any suitable construction and operation which will respond to the moisture content of the materials.

The present invention provides a very reliable and rugged unit which can be operated by persons of limited technical skill and consequently is particularly adapted to commercial concrete batching processes and the like which can be installed in a main plant or in temporary road plants for road paving and the like.

The mounting and connection of the moisture compensating potentiometers in the batching control system for selective automatic or manual setting provides a substantial improvement in moisture controlling systems.

Various modes of carrying out the invention are contemplated as being within the scope of the following claims particularly pointing out and distinctly claiming the subject matter which is regarded as the invention.

I claim:

1. A batching control unit for mixing a plurality of solid materials and water in a predetermined quantity ratio, comprising
    solid material feed control means including signal means established by comparison of a preset signal means for each solid material and a receiving signal means responsive to receipt of material to discontinue material delivery upon delivery of the preselected quantity, and
    water control means including water compensating signal means responsive to the moisture content of the solid material to correspondingly offset said comparison to increase the aggregate weighed by the amount of said moisture content, said signal means including memory means to retain the signal of the moisture content of each solid material and to cumulatively add said stored signals to effset said comparison.

2. The batching control unit of claim 1 wherein said water compensating signal means for each aggregate includes a movable indicator coupled to the memory means and therewith positioned to visually indicate the moisture content, said movable indicators being manually movable to control the memory means independently of the compensating signal means for manually adjusting the offset of said comparison.

3. A batching control for mixing a plurality of solid materials and water in a predetermined ratio, comprising
    solid material feed control means including signal means established by comparison of a preset signal means for each solid material and a receiving signal means responsive to receipt of material to discontinue material delivery upon delivery of the preselected quantity of material,
    a water feed control means including signal means established by comparison of a preset signal means and a water receiving signal means responsive to receipt of water to discontinue water delivery upon delivery of a selected quantity of water, and
    water control means including a pair of water compensating signal means similarly responsive to the moisture content in the solid material to correspondingly offset said comparison in the material feed control means and in the water feed control means to increase the aggregate delivered by the amount of said moisture content and to reduce the water delivered by a corresponding amount, said signal means including memory means to retain the signal of the moisture content of each of the solid materials and to cumulatively add said stored signals in the respective control means to offset said comparison in accordance with the total moisture content of the material being fed and material previously fed to form a selected material-water mix.

4. A batching control for mixing a plurality of solid materials and water in a predetermined ratio, comprising
    solid material feed control means including signal means established by comparison of preset signal means for each solid material and a receiving signal means responsive to receipt of material to discontinue material delivery upon delivery of the preselected quantity,
    second preset signal means coupled to the first-named preset signal means for corresponding positioning therewith,
    water control means including water compensating signal means energized by the second preset signal means and responsive to the moisture content in the solid material to create a percentage compensation signal for corresponding offsetting of said comparison to increase the delivered aggregate by the amount of said moisture content, said compensating signal means including memory means to retain the signal of the moisture content of the corresponding solid material independently of the operation of the feed control means, and
    means to operatively insert said compensating signal means in the material feed control means to cumulatively add said stored signals to offset said comparison in accordance with the moisture content of the material being delivered and all previous materials delivered.

5. An automatic cycle control for sequential delivery of solid materials to a material collecting means from individual storage means having electroresponsive discharge means and subsequently delivery of liquid to a liquid collecting means for subsequent mixing with the material in the material collecting means to produce a preselected material to liquid ratio, said materials including a limited amount of the liquid, comprising
    an automatc control circuit having preset signal means and feed responsive signal means for forming an electrical balance system for connection to said electroresponsive discharge means and opening and closing the same in accordance with the relative balance between the signal means,
    settable moisture signal means connected in said control circuit to modify the balance between the signal means,
    separate fluid sensing means for positioning one each within the several storage means and creating a liquid compensating signal proportional to the liquid in the corresponding material,
    drive means having an input means selectively connected to the sensing means and proportionately actuated by said compensating signals,
    coupling means selectively coupling the drive means to the moisture signal means, and
    manually operable means coupled to said moisture signal means for manually adjustment of the setting thereof.

6. An automatic cycle control for delivery of material in a batching process wherein liquid is added to the delivered material in a predetermined ratio and wherein said material may already include a limited amount of the fluid, comprising
    storage means for the material and having electroresponsive means for controlled feeding of the material therefrom,
    an automatic control circuit having preset signal means and feed responsive signal means forming an electrical balance system connected to control said electroresponsive means in accordance with the relative balance condition thereof,
    a fluid sensing means disposed within the storage means and creating a liquid compensating signal proportional to the liquid in the material,
    drive means connected to the sensing means and actuated by said compensating signal,
    individual settable compensating signal means for each material connected in said control circuit and having an input means selectively connected to said drive means to automatically vary the balance condition of the control circuit,
    electroresponsive means for sequentially connecting the preset signal means and the compensating signal means in circuit, and manually operable means coupled to said input means for manual adjustment of the setting of said settable means.

7. A moisture compensating control for a batch process wherein a plurality of aggregates are fed to a receiving means by operation of a material delivery control circuit and water is subsequently added to the mix, comprising
a moisture meter,
sensing means for sensing the percentage moisture in each of the aggregates and connected to the moisture meter to provide a proportional voltage signal and a visual indication of the moisture content,
a reference voltage system including a pair of voltage sources and a feedback source connected in series and producing a net operative zero voltage with the feedback source at zero and a net compensating voltage equal to the maximum voltage of the moisture meter at maximum,
a servo system having an input means connected to said moisture meter and said reference voltage system and output means connected to actuate the feedback source to provide a balance with the moisture meter,
water compensating signal sources for each aggregate selectively connected to the output means, and
means for selectively connecting said water compensating signal sources into the control circuit for the aggregate material delivery.

8. The moisture compensating control of claim 7 having
a water feed collecting system for automatically collecting a preset quantity of water, and
means selectively connecting water compensating signal sources into the collecting system to reduce the preset water by the moisture content of the aggregate.

9. A moisture compensating control for a batch process wherein a plurality of aggregates are fed to a weighing means and water is subsequently added, comprising
a moisture meter,
sensing probes for individually sensing the percentage moisture in each of the aggregates,
probe switch means selectively connecting the probes to the meter and providing a proportional voltage signal,
a reference voltage system including a pair of fixed direct current sources of different voltages connected in series opposition with each other and feedback potentiometers, one for each sensing probe, and producing a net zero voltage with the feedback potentiometer offset from one end thereof and a net compensating voltage equal to the maximum voltage of the moisture meter at maximum with the feedback potentiometer at the opposite end thereof,
potentiometer switch means selectively connecting the potentiometers in the voltage system,
a servo system including said moisture meter and said reference voltage system connected in series opposition to an amplifier having a reversible servo motor connected to its output, the feedback potentiometer being coupled to the motor and driven to balance the voltage signal of the moisture meter,
pairs of compensating signal potentiometers, one pair for each aggregate and each pair having a common input means,
clutch means selectively connectnig said common input means and said servo motor, and
drive means for synchronous operation of all said switch means to sequentially insert the related probes and feed-back potentiometers and clutch means in operative positions.

10. A moisture compensating control for a batch-process wherein a plurality of aggregates are fed to a collecting means and water is subsequently added, comprising
a direct current moisture meter,
sensing means connected in circuit with the moisture meter and inserted into the aggregate for sensing the percentage moisture in each of the aggregates and providing a proportional direct current voltage signal,
a reference voltage system including a pair of opposed fixed voltage sources of slightly different voltages and an adjustable feedback source connected in series and producing a net zero voltage with the feedback source offset from the zero voltage by the difference in the voltages and a net compensating voltage equal to the maximum voltage of the moisture meter at maximum setting of the feedback source,
a servo system including said moisture meter and said reference voltage system connected in series opposition to drive a servo motor which is connected to actuate the feedback source to provide a balanced input to the motor,
pairs of compensating signal potentiometers, one pair for each aggregate and each pair having a common input means,
clutch means connecting said common input means and said servo motor,
preset potentiometers, one for each compensating signal potentiometer for energizing the same in proportion to the corresponding aggregate quantity, and
means connecting one of each pair in a first cumulating signal circuit and the second of each pair in a second cumulating signal circuit.

11. A batching control for feeding a plurality of solid aggregates from individual storage means to an aggregate weighing means and water to a separate weighing means in selected ratios, comprising
an aggregate feed network including a reference branch circuit including a potentiometer providing a voltage signal directly proportional to the amount of material fed to the aggregate weighing means and a preset branch circuit including a separate weight presettable potentiometer for each aggregate, each providing a voltage signal proportional to the desired dry weight of the corresponding aggregate and a comparator connected to the output of the reference branch circuit and the preset branch circuit for producing an output in accordance with the voltage signal balance thereto,
an electrically operated feed control means for the storage means and arranged to be selectively operated for delivery of the respective materials to the aggregate weighing means,
moisture sensing means in each of the storage means providing an output signal proportional to the moisture content of the material within the corresponding storage means,
drive means to produce a mechanical movement proportional to the output signal of the moisture sensing means,
a plurality of moisture compensating potentiometers including manual input means, one for each aggregate,
clutch means coupling the compensating potentiometer to said drive means for automatic positioning of the potentiometers, and
a plurality of simultaneously driven switch means each having a plurality of circuit positions, said switch means being connected to sequentially provide a start circuit connection, a moisture set-up period connection for an aggregate and an aggregate feed period connection for each of the aggregates and a mix discharge and water feed circuit connection.

12. A batching control for feeding a plurality of solid aggregates from individual storage means to an aggregate weighing means and water to a separate weighing means in selected ratios, a voltage dividing network including a reference potentiometer branch circuit creating a voltage signal directly proportional to the amount of material fed to the aggregate weighing means and a preset branch circuit including a plurality of presettable aggregate potentiometers, one for each aggregate, said presettable potentiometers being selectively preset to create a voltage signal proportional to the desired dry weight of each aggregate, a comparator connected to the output of the reference circuit and the preset circuit for producing an output in accordance with the electrical balance therebetween, an electrically operated feed control means for the storage means and arranged to be selectively operated for delivery of the respective materials to the aggregate weighing means, moisture sensing means in each of the storage means providing an output signal proportional to the moisture content of the material within the corresponding storage means, a servo system including said sensing means and a feedback reference voltage system including a plurality of signal generators one for each of said storage means interconnected to energize a servo motor in accordance with the relative signals of the sensing means and the signal generators, a plurality of moisture compensating potentiometers including manual input means, one for each aggregate, clutch means for selective coupling of the compensating potentiometers to said servo motor for automatic positioning of the compensating potentiometers, visual indicating means coupled to the compensating potentiometers to show the settings thereof, a moisture meter connected to said sensing means to show the sensed moisture content, and a plurality of simultaneously driven switch means each having a plurality of circuit positions, said switch means being connected to sequentially provide a start circuit connection, a moisture set-up period connection for an aggregate and an aggregate feed period connection for each of the aggregates in sequence and water feed and discharge circuit connection.

13. A batching control for feeding a plurality of solid aggregates from individual storage means to an aggregate weighing means and water to a separate weighing means in selected ratios, a voltage dividing network including a reference potentiometer branch circuit creating a voltage signal directly proportional to the amount of material fed to the aggregate weighing means and a preset branch circuit including a plurality of aggregate presettable potentiometers, one for each aggregate, said presettable potentiometers being selectively preset to create a voltage signal proportional to the desired dry weight of each aggregate, a comparator connected to the output of the reference circuit and the preset circuit for producing an output in accordance with the electrical balance thereto, switch means sequentially connecting said presettable potentiometers in the preset branch circuit to sequentially control delivery of the several aggregates, an electrically operated feed control means for the several storage means and arranged to be selectively operated for delivery of the respective materials to the aggregate weighing means, switch means sequentially connecting the feed control means to deliver said aggregates in sequence, moisture sensing means in each of the storage means providing an output signal proportional to the moisture content of the material within the corresponding storage means, a servo system including selectively said sensing means and a feedback reference voltage system including a plurality of feedback potentiometers one for each of said storage means interconnected to energize a servo motor in accordance with the relative signals of the sensing means and the feedback potentiometers, a pair of feedback switch means sequentially connecting the corresponding sensing means and feedback potentiometers in circuit, a plurality of moisture compensating potentiometers including manual input means, one for each aggregate and connected with the voltage dividing network to the comparator to offset the balance input thereto, electroresponsive clutch means for selective coupling of the compensating potentiometer to said servo motor for automatic positioning of the potentiometers, switch means for sequential energization of the clutch means, visual indicating means coupled to the compensating potentiometers to show the automatic settings thereof and permitting manual adjustment thereof, a moisture meter connected to said sensing means to show the sensed moisture content, and all of said switch means being similarly constructed and simultaneously driven, each switch means having a similar plurality of contacts sequentially engaged and including start contacts to initiate an automatic cycle, a first aggregate moisture sensing contact wherein the moisture in the first aggregate is sensed and the compensating potentiometers set accordingly, a first aggregate feed contact wherein aggregate is fed from the corresponding storage means in accordance with the setting of the corresponding presettable potentiometer and the setting of the corresponding moisture compensating potentiometer, paired contacts corresponding to the first aggregate sensing and feed contacts for each other aggregate and a mix discharge and water set-up contact.

14. The batching control of claim 13 wherein said sensing means and said feedback potentiometer is selected to create a voltage drop across the feedback potentiometer in excess of that across the sensing means, said feedback reference voltage system includes a resistance means connected in series with the feedback potentiometers by the feedback switch means and a fixed voltage source is impressed thereacross, and a reference voltage is connected in series with the sensing means to provide a maximum voltage drop equal to the maximum voltage drop across the reference voltage system.

15. A control unit for delivery of solid material and water comprising solid material control means including sensing means for sensing the quantity of material delivered and preset means interconnected to control the delivery of material, water control means including sensing means for sensing the quantity of water added and water preset means interconnected to control delivery of water.

moisture compensating signal means including means for producing a water compensating signal in a memory means in accordance with the moisture content of the solid material, means separately connecting said memory means in said material signal means and said water signal means to modify the material signal means to increase the total weight of material delivered and thereby provide a selected delivery of dry material and to decrease the moisture compensating or the water signal means to decrease the water added and produce a signal corresponding to the net total water in the final mixture, and means to separately actuate the water control means and the material control means to complete the batching operation.

16. The control unit of claim 15 wherein said material control means and said water control means include voltage balancing circuits and said memory means includes a plurality of potentiometers connected in the respective circuits, and
   a servo system actuated by the moisture compensating signal means and selectively coupled to said potentiometers to set the potentiometers in accordance with compensating signal.

17. The control unit of claim 16 having stepping switch means connected in circuit with the material control means and a drive means for selective coupling of the servosystem to the potentiometers, and means to simultaneously drive the switch means through an operating cycle and to reset the switch means in response to the completion of the weighing of the solid material.

References Cited by the Examiner

UNITED STATES PATENTS

| | | | |
|---|---|---|---|
| 2,750,144 | 6/1956 | Beckwith | 177—70 X |
| 2,968,463 | 1/1961 | Noble | 177—70 X |
| 3,117,640 | 1/1964 | MacKinney | 177—80 |
| 3,156,312 | 10/1964 | Heltzel et al. | 177—70 |
| 3,173,505 | 3/1965 | Thorsson et al. | 177—70 |

LEO SMILOW, *Primary Examiner.*

GEORGE J. PORTER, *Assistant Examiner.*